United States Patent
Hwang

(10) Patent No.: US 11,560,102 B2
(45) Date of Patent: Jan. 24, 2023

(54) VEHICLE WITH SPEAKER FOR OUTPUTTING VIRTUAL ENGINE SOUND AND CONTROLLING METHOD THEREOF

(71) Applicants: Hyundai Motor Company, Seoul (KR); Kia Motors Corporation, Seoul (KR)

(72) Inventor: Yonghwan Hwang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/026,891

(22) Filed: Sep. 21, 2020

(65) Prior Publication Data

US 2021/0253036 A1 Aug. 19, 2021

(30) Foreign Application Priority Data

Feb. 19, 2020 (KR) .................. 10-2020-0020282

(51) Int. Cl.
| | | |
|---|---|---|
| *B60R 11/02* | (2006.01) | |
| *B60Q 1/00* | (2006.01) | |
| *H04R 1/02* | (2006.01) | |
| *H04R 5/02* | (2006.01) | |
| *H04R 5/04* | (2006.01) | |
| *H04R 3/04* | (2006.01) | |
| *H04B 1/08* | (2006.01) | |

(52) U.S. Cl.
CPC ........ *B60R 11/0217* (2013.01); *B60Q 1/0023* (2013.01); *H04R 1/025* (2013.01); *H04R 1/028* (2013.01); *H04R 3/04* (2013.01); *H04R 5/02* (2013.01); *H04R 5/04* (2013.01); *H04B 1/082* (2013.01); *H04R 2499/13* (2013.01)

(58) Field of Classification Search
CPC .......... B60R 11/0217; B60R 2011/004; B60R 16/02; B60Q 1/0023; B60Q 1/0017; B60Q 5/005; B60Q 5/008; H04R 1/028; H04R 3/04; H04R 5/02; H04R 5/04; H04R 2499/13
USPC ...................... 381/86, 302, 389; 362/86, 507
See application file for complete search history.

(56) References Cited

U.S. PATENT DOCUMENTS

| | | | | |
|---|---|---|---|---|
| 2,037,826 A | * | 4/1936 | Sandberg | ................. B60Q 5/00 340/815.69 |
| 5,047,747 A | * | 9/1991 | Gottlieb | ................... B60Q 1/22 340/463 |
| 6,909,376 B2 | * | 6/2005 | Rennick | ................. G01S 7/521 340/693.6 |

(Continued)

OTHER PUBLICATIONS

B. Kolbrek, "Horn therory: An Instruction, Part 1", Article prepared for www.audioXpress.com, pp. 1-9 (2008).

(Continued)

*Primary Examiner* — Xu Mei
(74) *Attorney, Agent, or Firm* — Fox Rothschild LLP

(57) ABSTRACT

A vehicle and a controlling method of the same include a speaker outputting virtual engine sound integrated with a head lamp. The vehicle includes the head lamp; a head lamp case in which the head lamp is provided; and a speaker for outputting a virtual engine sound, and provided inside the head lamp case, where an internal cross-sectional area of the head lamp case may increase in a direction toward a front of the vehicle based on a position where the speaker is provided.

2 Claims, 8 Drawing Sheets

(56) References Cited

U.S. PATENT DOCUMENTS

| | | | | |
|---|---|---|---|---|
| 9,473,854 | B2* | 10/2016 | Yasuike | H04R 1/028 |
| 2009/0010477 | A1* | 1/2009 | Frobisher | H04R 7/045 |
| | | | | 381/386 |
| 2013/0058121 | A1* | 3/2013 | Tatara | B60Q 1/0017 |
| | | | | 362/546 |
| 2019/0392811 | A1* | 12/2019 | Lee | H04R 3/00 |

OTHER PUBLICATIONS

B. Kolbrek, "Horn therory: An Instruction, Part 2", Article prepared for www.audioXpress.com, pp. 1-8 (2008).

* cited by examiner

VEHICLE WITH SPEAKER FOR OUTPUTTING VIRTUAL ENGINE SOUND AND CONTROLLING METHOD THEREOF

CROSS-REFERENCE TO RELATED APPLICATION(S)

This application claims under 35 U.S.C. § 119 the benefit of Korean Patent Application No. 10-2020-0020282, filed on Feb. 19, 2020, the entire contents of which are incorporated by reference herein.

BACKGROUND

1. Technical Field

The present disclosure relates to a vehicle configured to output virtual engine sound through a speaker and a controlling method thereof, more particularly, to the vehicle including a speaker integrated into a head lamp of the vehicle for outputting the virtual engine sound.

2. Description of the Related Art

In general, an electric vehicle can be driven by a motor, and generates little noise according to a low noise characteristic of the motor. Therefore, even when the electric vehicle approaches, the noise level may be low, and the probability of an accident may increase because pedestrians are not aware of the presence of the vehicle.

Accordingly, in recent years, a virtual engine sound system (VESS) that virtually outputs engine sound so that pedestrians can recognize an approach of the electric power vehicle is installed in the electric power vehicle.

However, as the existing VESS speaker is provided inside the engine room or the bumper, acoustic energy transmission to the outside may be inefficient, and in many cases, directional control may not be possible.

SUMMARY

The present disclosure provides a vehicle and a control method thereof including a speaker configured to output virtual engine sound, the speaker being integrated with a head lamp of the vehicle.

In accordance with an aspect of the present disclosure, a vehicle may include a head lamp; a head lamp case in which the head lamp is provided; and a speaker for outputting a virtual engine sound, and provided inside the head lamp case, and an internal cross-sectional area of the head lamp case may increase in a direction toward a front of the vehicle based on a position where the speaker is provided.

The speaker may include a vibration plate provided toward a front of the vehicle, the speaker having an area equal to the internal cross-sectional area of the head lamp case at the position where the speaker is provided.

The vehicle may further comprise a temperature sensor configured to sense an internal temperature of the head lamp case.

The vehicle may further comprise a controller configured to control an output of the speaker based on the internal temperature of the head lamp case.

The controller may control the output of the speaker to be inversely proportional to the internal temperature of the head lamp case.

The speaker may include a first speaker provided in a left head lamp case; and a second speaker provided in a right head lamp case.

The vehicle may further comprise a steering angle sensor configured to sense a rotation angle of a steering wheel; a controller configured to adjust output level and phase of each of the first speaker and the second speaker based on the rotation angle and a rotation direction of the steering wheel.

The controller may adjust an output level of the speaker corresponding to the rotation direction of the steering wheel among the first speaker and the second speaker, and adjust a phase of the speaker corresponding to an anti-rotation direction of the steering wheel among the first speaker and the second speaker.

The controller may adjust the output level and the phase in proportion to the rotation angle of the steering wheel.

In accordance with an aspect of the present disclosure, a controlling method of a vehicle including a head lamp, a head lamp case in which the head lamp is provided, a speaker for outputting a virtual engine sound and provided inside the head lamp case, and a temperature sensor for sensing an internal temperature of the head lamp case, the method may include controlling an output of the speaker to be inversely proportional to the internal temperature of the head lamp case.

An internal cross-sectional area of the head lamp case may increase in a direction toward a front of the vehicle based on a position where the speaker is provided.

The speaker may include a vibration plate provided toward a front of the vehicle, the speaker having an area equal to the internal cross-sectional area of the head lamp case at the position where the speaker is provided.

In accordance with an aspect of the present disclosure, a controlling method of a vehicle including a head lamp, a head lamp case in which the head lamp is provided, a speaker for outputting a virtual engine sound and provided inside the head lamp case, and a steering angle sensor configured to sense rotation angle of the steering wheel, the method may include adjusting an output level and a phase of the speaker based on a rotation angle and a rotation direction of the steering angle sensor.

An internal cross-sectional area of the head lamp case may increase in a direction toward a front of the vehicle based on a position where the speaker is provided.

The speaker may include a vibration plate provided toward a front of the vehicle, the speaker having an area equal to the internal cross-sectional area of the head lamp case at the position where the speaker is provided.

The speaker may include a first speaker provided in a left head lamp case; and a second speaker provided in a right head lamp case.

Adjusting the output level and phase of the speaker may include adjusting an output level of the speaker corresponding to the rotation direction of the steering wheel among the first speaker and the second speaker, and adjusting a phase of the speaker corresponding to an anti-rotation direction of the steering wheel among the first speaker and the second speaker.

Adjusting the output level and phase of the speaker may include adjusting the output level and the phase in proportion to the rotation angle of the steering wheel.

According to a vehicle and a controlling method according to one aspect, by including a speaker that is integrated with the head lamp and outputs a virtual engine sound, it is possible to transfer the virtual engine sound to the pedestrian more efficiently because the energy transfer of the virtual engine sound to the outside is efficient and the direction of the virtual engine sound can be adjusted.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
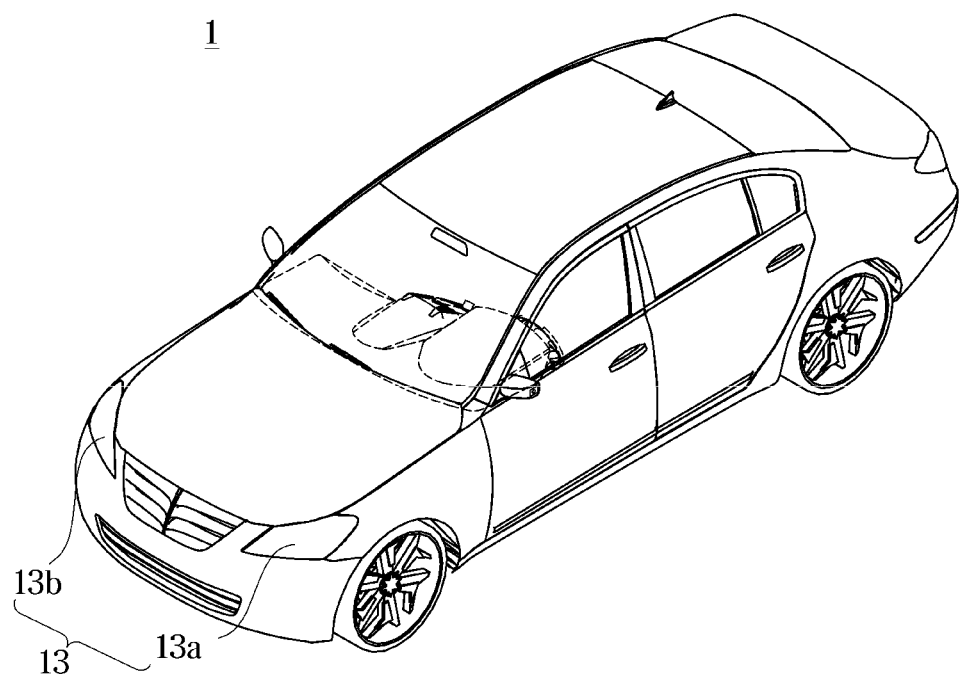
FIG. 1 illustrates an exterior of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Like reference numerals refer to like elements throughout. The present disclosure does not describe all elements of the embodiments, and overlaps between the general contents or the embodiments in the technical field to which the present invention belongs.

Throughout the specification, when an element is referred to as being "connected to" another element, it may be directly or indirectly connected to the other element and the "indirectly connected to" includes being connected to the other element via a wireless communication network.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the present invention.

FIG. 1 illustrates an exterior of a vehicle according to an exemplary embodiment.

Referring to FIG. 1, a head lamp unit 13 for irradiating illumination in the traveling direction of the vehicle 1 may be provided in front of the vehicle 1. The head lamp unit 13 may include a left head lamp unit 13a provided on the left side and a right head lamp unit 13b provided on the right side based on a direction toward the front of the vehicle 1.

The vehicle 1 may be an eco-friendly vehicle that uses electric energy, including a motor that provides power, such as an electric vehicle and a hybrid vehicle.

Accordingly, vehicle 1 may include a virtual engine sound system (VESS) when driving using a motor, and may include a speaker for outputting virtual engine sound. Hereinafter, a speaker for outputting a virtual engine sound will be described in detail.

Figure 2:
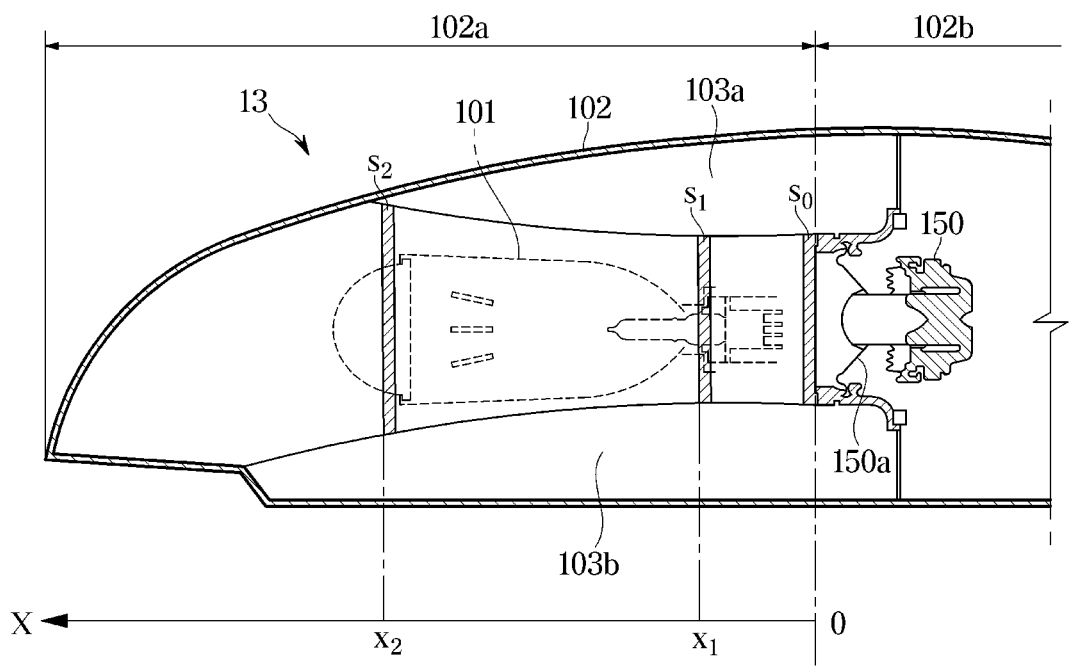
FIG. 2 illustrates a cross-sectional diagram of a head lamp unit according to an embodiment.

FIG. 2 illustrates a cross-sectional diagram of the head lamp unit 13 according to an embodiment.

Referring to FIG. 2, the head lamp unit 13 according to an embodiment may include a head lamp 101 and a head lamp case 102 on which the head lamp 101 is provided.

The head lamp case 102 may include a speaker 150 that outputs a virtual engine sound therein. That is, the speaker 150 may correspond to a speaker for VESS, and when vehicle 1 is driven according to the power of the motor, may output a virtual engine sound.

As described above, the vehicle 1 according to an embodiment includes the speaker 150 for outputting a virtual engine sound to the head lamp unit 13, where the acoustic energy transmission efficiency of the virtual engine sound can be increased as compared to a case where impedance is located inside a high bumper.

The speaker 150 according to an embodiment includes a vibration plate 150a provided toward the front of vehicle 1. The speaker 150 preferably has the same area as the internal cross-sectional area S0 of the head lamp case 102 at the position 0 where the speaker 150 is provided. Further, the speaker 150 may be arranged with a cross-sectional area horizontal to the vibration plate 150a.

Through this, the speaker 150 may divide the head lamp case 102 into the front area 102a and the rear area 102b based on the position 0 where the speaker 150 is provided, and may reduce the offset between the front wave output from the speaker 150 and forward to the front and the rear wave output from the speaker 150 and toward the rear.

Thus, the speaker 150, by providing the same cross-sectional area as the internal cross-sectional area $S_0$ of the head lamp case 102 based on the position 0 where the speaker 150 is provided, divides the head lamp case 102 into a front area 102a and a rear area 102b. Further, by using the rear area 102b as an enclosure, it is possible to prevent acoustic shortening while enhancing the bass in the virtual engine sound.

In addition, the internal cross-sectional area S of the head lamp case 102 according to an embodiment may increase in the direction toward the front of the vehicle 1 based on the position 0 where the speaker 150 is provided.

For example, the internal cross-sectional area S1 of the head lamp case 102 at a point xl located relatively close to the position 0 where the speaker 150 is provided may be narrower than the internal cross-sectional area S2 of the head lamp case 102 at a point X2 positioned relatively far from the position 0 provided.

That is, in the front region 102a of the head lamp case 102, a taper for a horn structure may be formed, and structures 103a and 103b for the taper may be provided. However, according to an embodiment, the front region 102a of the head lamp case 102 may be provided in a shape of a horn itself, and in this case, the structures 103a and 103b for the taper may be omitted.

Through this, the virtual engine sound output from the speaker 150 may have high radiation efficiency due to the horn structure that is gradually increased in comparison with the output area of the speaker 150, and finally amplified.

The structural features of the speaker 150 provided in the head lamp unit 13 have been described. Hereinafter, control of the speaker 150 based on an internal temperature of the head lamp unit 13 or a rotation angle of the steering wheel (not shown) will be described in detail.

Figure 3:
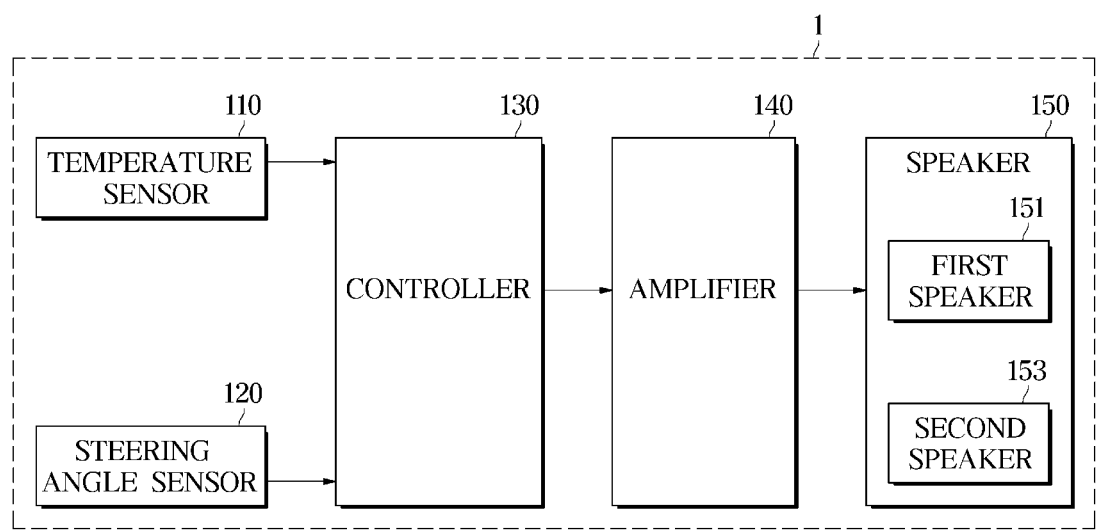
FIG. 3 illustrates a control block diagram of the vehicle according to an embodiment.
Figure 4:
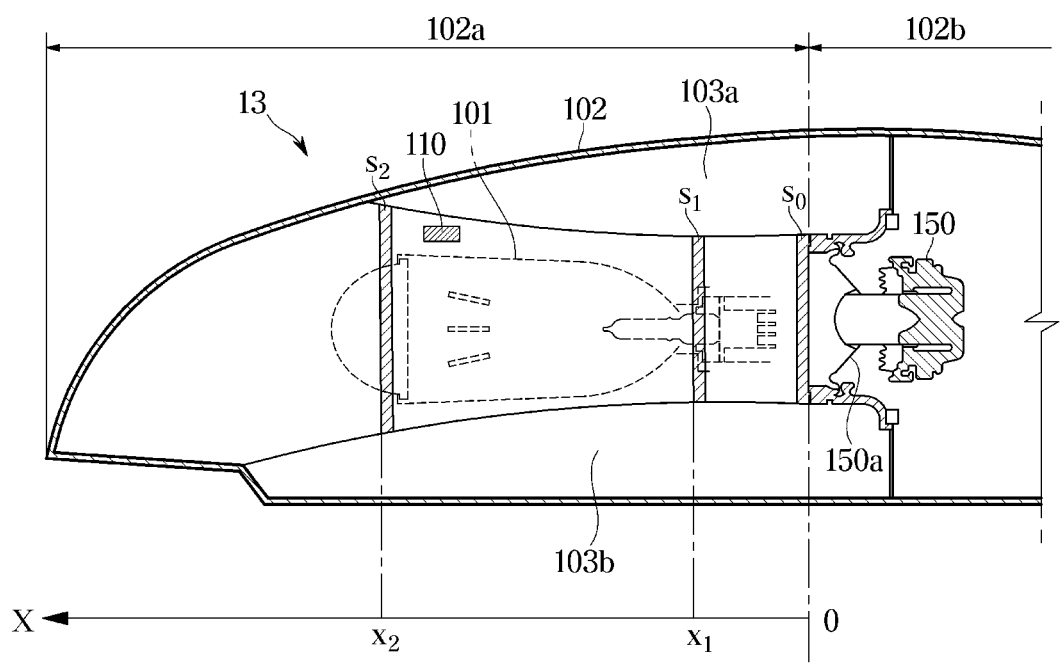
FIG. 4 is a cross-sectional diagram when the head lamp unit according to an embodiment includes a temperature sensor.
Figure 5:
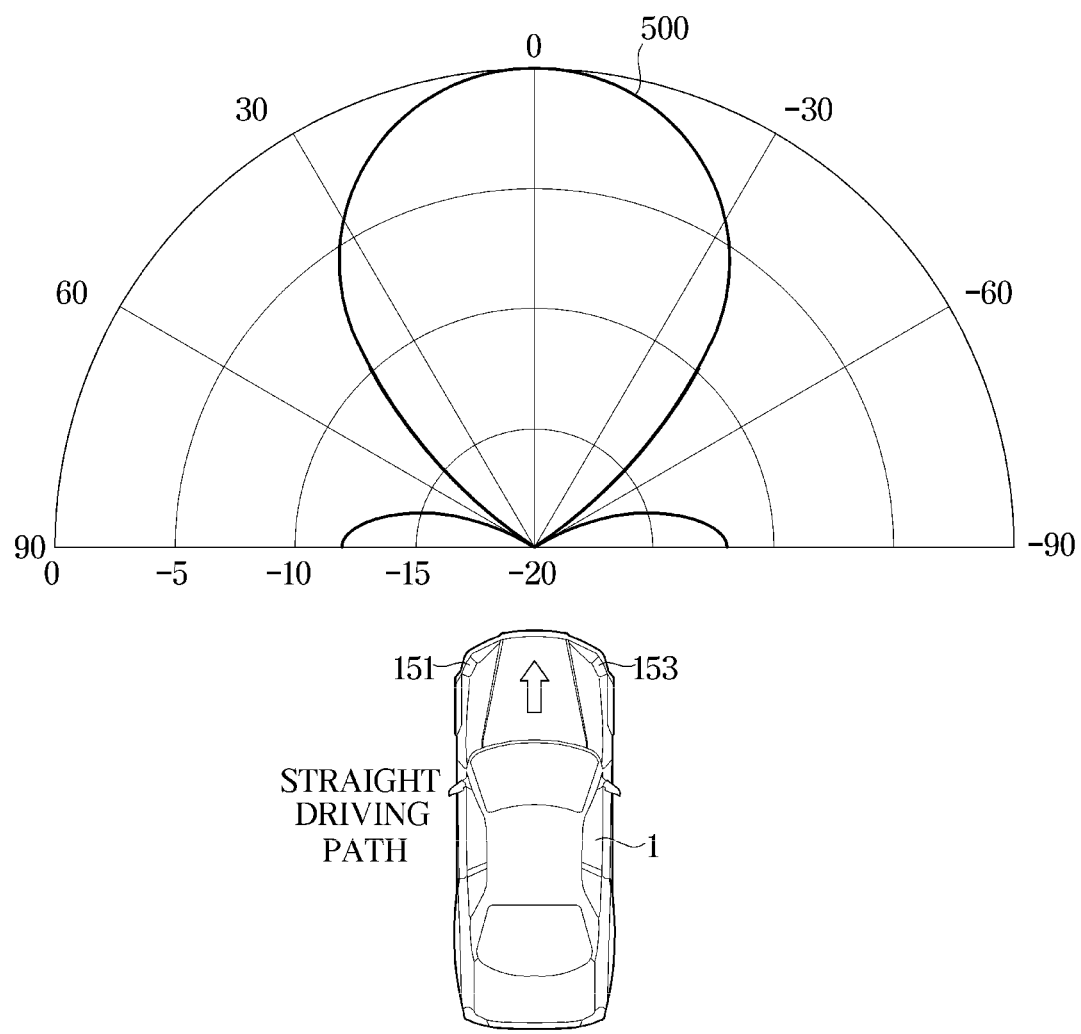
FIG. 5 is a diagram showing an output direction from a speaker when a driving path of the vehicle is straight ahead according to an embodiment.
Figure 6:
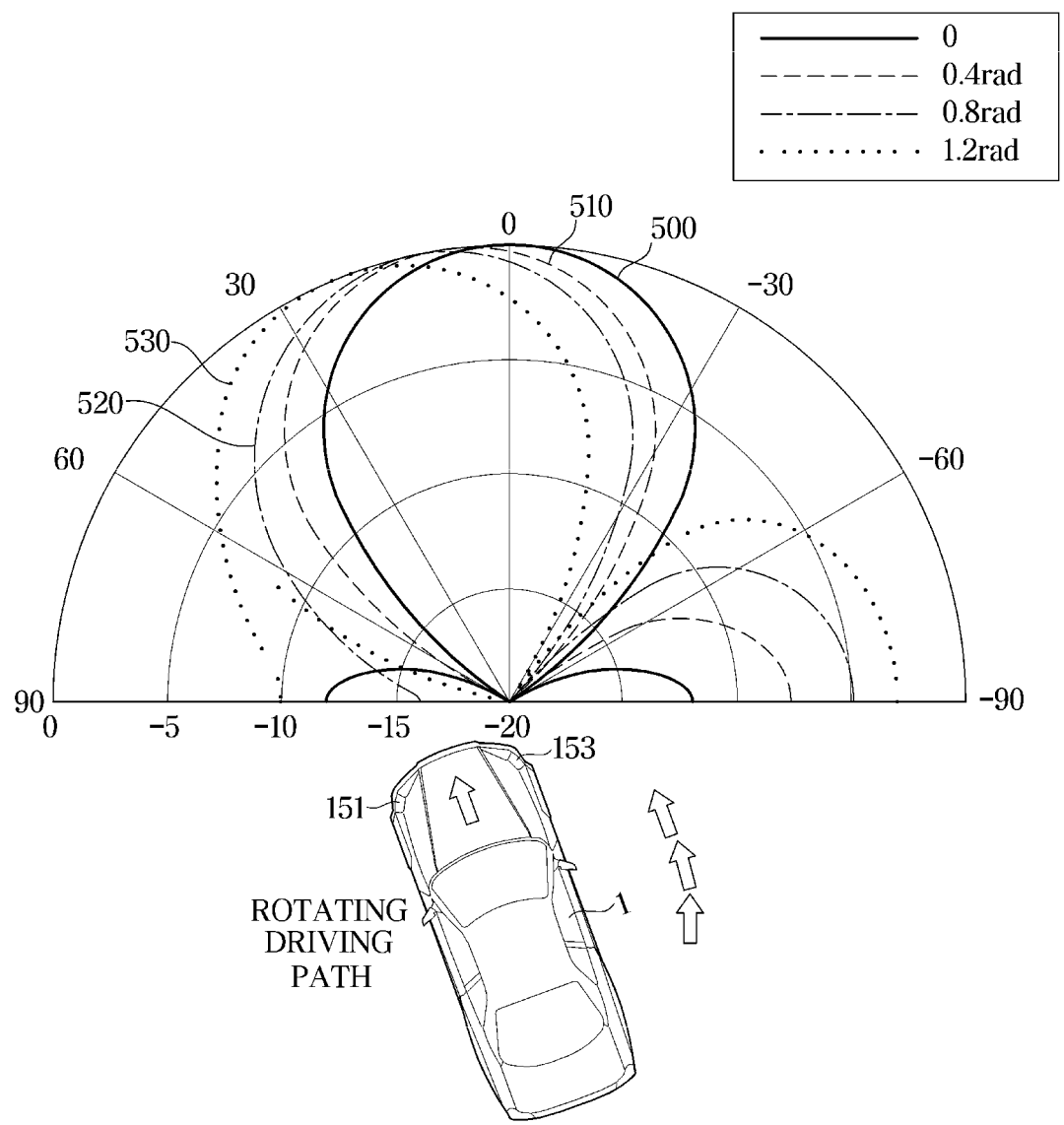
FIG. 6 is a diagram for explaining directivity according to a phase difference between a first speaker and a second speaker according to an embodiment.

FIG. 3 illustrates a control block diagram of the vehicle 1 according to an embodiment. FIG. 4 is a cross-sectional diagram when the head lamp unit 13 according to an embodiment includes a temperature sensor. FIG. 5 is a diagram showing an output direction from a speaker when the driving path of the vehicle is straight ahead according to an embodiment. FIG. 6 is a diagram for explaining directivity according to a phase difference between a first speaker and a second speaker according to an embodiment.

Referring to FIG. 3, the vehicle 1 according to an embodiment includes a temperature sensor 110 for detecting the internal temperature of the head lamp unit 13, a steering angle sensor 120 for detecting the rotation angle of the steering wheel, a controller 130 that controls the speaker 150 based on the internal temperature of the head lamp unit 13 or the rotation angle of the steering wheel, an amplifier 140 that supplies current to the speaker 150 under the control of the controller 130, and a speaker 150 provided in the head lamp unit 13.

In particular, the speaker 150 includes a first speaker 151 provided in the left head lamp unit (left head lamp case) 13a, and a second speaker 153 provided on the right head lamp unit (right head lamp case) 13b, and the first speaker 151 and the second speaker 153 may correspond to the same type of speaker.

The temperature sensor 110 according to an embodiment is a sensor of a well-known type capable of measuring temperature, as shown in FIG. 4, provided inside the head lamp case 102, and can detect the internal temperature of the head lamp case 102.

The steering angle sensor 120 according to an embodiment may be a sensor of a known type that detects a rotation angle of a steering wheel, and outputs a value sensed by the controller 130.

The controller 130 according to an embodiment may control the amplifier 140 so that the speaker 150 outputs a virtual engine sound when vehicle 1 is driven based on power supplied from a motor.

The amplifier 140, under the control of the controller 130, can transmit a sound signal corresponding to the virtual engine sound to the speaker 150. That is, the amplifier 140 can supply a current corresponding to the sound signal to the speaker 150.

The controller 130 according to an embodiment may control the output of the speaker 150 based on the internal temperature of the head lamp case 102. That is, the controller 130 may adjust the amount of current output from the amplifier 140 and supplied to the speaker 150 based on the output of the temperature sensor 110.

Specifically, the controller 130 may control the output of the speaker 150 to be inversely proportional to the internal temperature of the head lamp case 102. That is, the controller 130 may increase the amount of current output from the amplifier 140 so that the output of the speaker 150 increases as the internal temperature decreases, and may lower the amount of current output from the amplifier 140 so that the output of the speaker 150 decreases as the internal temperature increases.

In order to compensate for the physical characteristics of the sound wave transmission speed depending on the temperature, the vehicle 1 according to an embodiment may provide a virtual engine sound that is not distorted by adjusting the output of the speaker 150 even when the temperature is changed.

In addition, the controller 130 according to an embodiment may adjust the output level and phase of each of the first speaker 151 and the second speaker 153 based on the rotation angle and the rotation direction of the steering wheel. That is, the controller 130 controls the amplifier 140 to adjust the current size and timing of supply to each of the first speaker 151 and the second speaker 153 based on the output value of the steering angle sensor 120, thereby the output level and phase of each of the first speaker 151 and the second speaker 153 can be adjusted.

Specifically, the controller 130 adjusts the output level of the speaker corresponding to the rotation direction of the steering wheel among the first speaker 151 and the second speaker 153 in an increasing direction, and may adjust the phase of the speaker corresponding to the opposite direction of the rotation direction of the steering wheel among the first speaker 151 and the second speaker 153 to a delayed direction.

When the vehicle 1 travels along a straight path, the virtual engine sound output from the first speaker 151 and the virtual engine sound output from the second speaker 153 may have the same size and the same phase. Accordingly, the final virtual engine sound 500 may face the front corresponding to the driving direction of vehicle 1, as shown in FIG. 5.

If the phase of the virtual engine sound output from the second speaker 153 is delayed based on the phase of the virtual engine sound output from the first speaker 151, the final virtual engine sound may have directionality to the left of the first speaker 151.

As shown in FIG. 6, as the phase delay in the second speaker 153 increases from 0 to 0.4 rad, 0.8 rad, and 1.2 rad, the final virtual engine sound may have more directivity to the left. That is, the final virtual engine sound may move from the 500 position to the 530 position as the phase delay in the second speaker 153 increases.

As described above, when the vehicle 1 rotates left, the controller 130 adjusts the output level of the first speaker 151 located on the left in a direction to increase and the phase of the second speaker 153 located on the right is delayed, thereby the controller 130 can adjust the final virtual engine sound is directional to the left.

Also, when the vehicle 1 rotates right, the controller 130 adjusts the output level of the second speaker 153 located on the right in a direction to increase and the phase of the first speaker 151 located on the left is delayed, thereby the controller 130 can adjust the final virtual engine sound is directional to the right.

As described above, the vehicle 1 according to an embodiment provides a virtual engine sound to a position corresponding to a driving path of vehicle 1 by controlling the speaker 150 so that the virtual engine sound has directionality in a rotational direction, and thereby allows pedestrians to accurately identify approach of the vehicle 1.

The controller 130 may adjust the output level and phase in proportion to the rotation angle of the steering wheel. That is, as the rotation angle of the steering wheel is increased, the controller 130 may adjust the output level and phase of each of the steering wheels in an increasing direction.

The controller 130 may include at least one memory in which programs for performing the above-described operations and the operations described below are stored, and at least one processor for executing the stored programs. In the case of a plurality of memory and processors, it is possible that they are integrated in one chip, and it is also possible to be provided in a physically separate location.

Hereinafter, a control method of the vehicle 1 according to an embodiment will be described. The vehicle 1 according to the above-described embodiment may be applied to the control method of the vehicle 1 described later. Therefore, the contents described with reference to FIGS. 1 to 6 are equally applicable to the control method of the vehicle 1 according to an embodiment even if there is no special mention.

Figure 7:
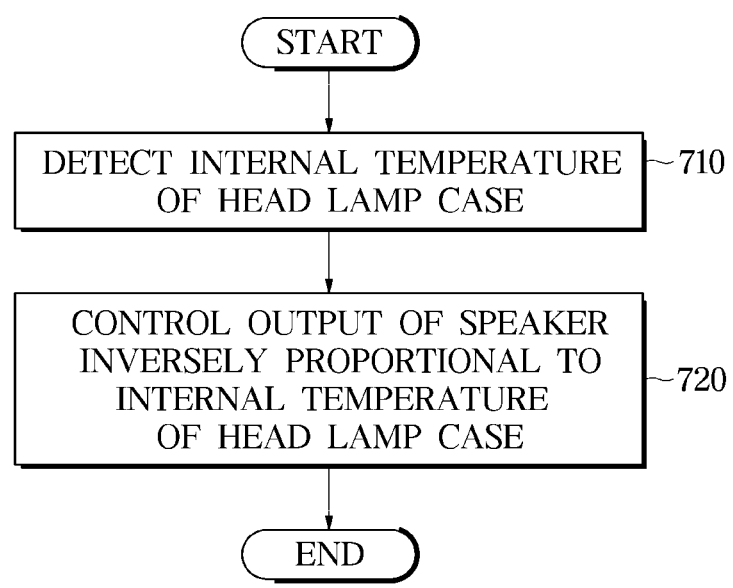
FIG. 7 is a flowchart illustrating a case of compensating an output of the speaker based on an output of the temperature sensor in a control method of a vehicle according to an embodiment.

FIG. 7 is a flowchart illustrating a case of compensating the output of a speaker 150 based on the output of a temperature sensor in a control method of a vehicle 1 according to an embodiment.

Referring to FIG. 7, vehicle 1 according to an embodiment may sense the internal temperature of the head lamp case 102 (710).

That is, the controller 130 may sense the internal temperature of the head lamp case 102 based on the output of the temperature sensor 110 provided in the head lamp case 102.

The vehicle 1 according to an embodiment may control the output of the speaker 150 to be inversely proportional to the internal temperature of the head lamp case 102 (720).

Specifically, the controller 130 may control the output of the speaker 150 to be inversely proportional to the internal temperature of the head lamp case 102. That is, the controller 130 may increase the size of current output from the amplifier 140 so that the output of the speaker 150 increases as the internal temperature decreases. Also, the controller 130 may decrease the size of the current output from the amplifier 140 so that the output of the speaker 150 decreases as the internal temperature increases.

This is for compensating for the physical characteristics in which the sound wave transmission speed varies depending on the temperature, and the vehicle 1 according to an embodiment adjusts the output of the speaker 150 even in a situation in which the temperature varies, thereby generating a undistorted virtual engine sound.

Figure 8:
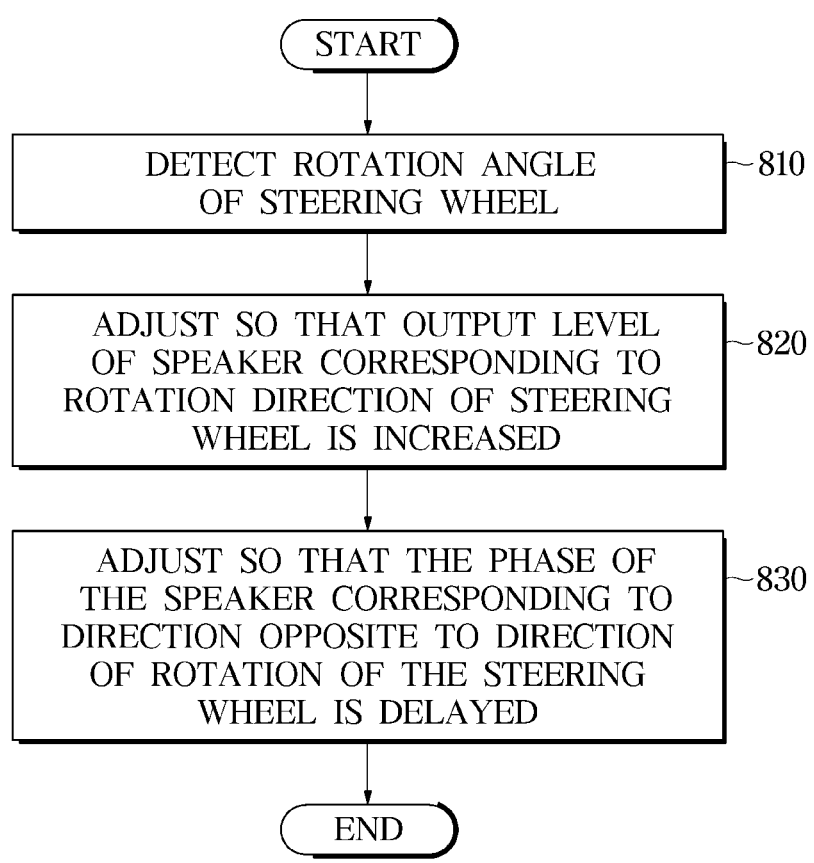
FIG. 8 is a flowchart illustrating a case in which directionality of the speaker is adjusted based on a rotation angle of a steering wheel in a control method of a vehicle according to an embodiment.

FIG. 8 is a flowchart illustrating a case in which the directionality of a speaker 150 is adjusted based on a rotation angle of a steering wheel in a control method of the vehicle 1 according to an embodiment.

Referring to FIG. 8, the vehicle 1 according to an embodiment may detect the rotation angle of the steering wheel (810).

That is, the controller 130 may sense the rotation angle of the steering wheel based on the output of the steering angle sensor 120.

The vehicle 1 according to an embodiment may be adjusted to increase the output level of the speaker 150 corresponding to the rotation direction of the steering wheel (820), and may adjust so that the phase of the speaker 150 corresponding to the direction opposite to the direction of rotation of the steering wheel is delayed (830).

That is, when the vehicle 1 rotates left, the controller 130 adjusts the output level of the first speaker 151 located on the left in a direction to increase and the phase of the second speaker 153 located on the right is delayed, thereby the controller 130 can adjust the final virtual engine sound is directional to the left.

Also, when the vehicle 1 rotates right, the controller 130 adjusts the output level of the second speaker 153 located on the right in a direction to increase and the phase of the first speaker 151 located on the left is delayed, thereby the controller 130 can adjust the final virtual engine sound is directional to the right.

At this time, the controller 130 may adjust the output level and phase in proportion to the rotation angle of the steering wheel. That is, as the rotation angle of the steering wheel is increased, the controller 130 may adjust the output level and phase of each of the steering wheels in an increasing direction.

As described above, the vehicle 1 according to an embodiment provides a virtual engine sound to a position corresponding to a driving path of the vehicle 1 by controlling the speaker 150 so that the virtual engine sound has directionality in a rotational direction, and thereby allows pedestrians to accurately identify approach of the vehicle 1.

The non-transitory computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle, comprising:

a head lamp;

a head lamp case in which the head lamp is provided; and a speaker for outputting a virtual engine sound, the speaker being provided inside the head lamp case, wherein an internal cross-sectional area of the head lamp case increases in a direction toward a front of the vehicle based on a position where the speaker is provided, and wherein the speaker comprises a vibration plate provided toward the front of the vehicle, wherein a cross-sectional area of the speaker has a same size as the internal cross-sectional area of the head lamp case at the position where the speaker is provided, so that the speaker spatially separates the head lamp case into a first area and a second area based on the position where the speaker is provided, wherein the cross-sectional area of the speaker is horizontal to the vibration plate, and wherein the second area of the head lamp case acts as an enclosure for the speaker.

2. The vehicle according to claim 1, wherein the speaker includes:

a first speaker provided in a left head lamp case; and a second speaker provided in a right head lamp case.

* * * * *